United States Patent
Liang et al.

(10) Patent No.: US 10,432,775 B2
(45) Date of Patent: Oct. 1, 2019

(54) EMERGENCY CALL CIRCUIT FOR ELECTRONIC DEVICE

(71) Applicant: Wistron Corporation, New Taipei (TW)

(72) Inventors: Chen-Yi Liang, New Taipei (TW); Chun-Kuan Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/933,360

(22) Filed: Mar. 22, 2018

(65) Prior Publication Data

US 2019/0173993 A1 Jun. 6, 2019

(30) Foreign Application Priority Data

Dec. 5, 2017 (TW) ............................. 106142497 A (51) Int. Cl.
*H04W 52/02* (2009.01)
*H04M 1/725* (2006.01)
*H04M 3/51* (2006.01)

(52) U.S. Cl.
CPC ..... *H04M 1/72541* (2013.01); *H04M 3/5116* (2013.01); *H04W 52/0251* (2013.01); *H04W 52/0254* (2013.01); *H04W 52/0296* (2013.01)

(58) Field of Classification Search
CPC ........... H04W 52/0277; H04W 52/028; H04W 52/04; H04W 52/0258; H04W 76/50; H04W 52/0264; H04W 52/02
See application file for complete search history.

(56) References Cited

U.S. PATENT DOCUMENTS

| | | | | |
|---|---|---|---|---|
| 5,694,452 A | * | 12/1997 | Bertolet | H04M 1/0214 379/38 |
| 2006/0164217 A1 | * | 7/2006 | Bourgine De Meder | B60R 25/10 340/432 |
| 2007/0265019 A1 | * | 11/2007 | Rey-Robert | H04W 48/04 455/456.4 |
| 2009/0005165 A1 | * | 1/2009 | Arezina | G07F 17/32 463/37 |
| 2009/0045779 A1 | * | 2/2009 | Sherman | H02J 7/0031 320/136 |
| 2009/0129561 A1 | * | 5/2009 | Siegel | H04M 3/4288 379/45 |

(Continued)

FOREIGN PATENT DOCUMENTS

| | | |
|---|---|---|
| CN | 201590902 U | 9/2010 |
| CN | 104618610 | 5/2015 |
| TW | 200518572 | 6/2005 |

*Primary Examiner* — Jean A Gelin
(74) *Attorney, Agent, or Firm* — Winston Hsu (57) ABSTRACT

An emergency call circuit for an electronic device includes a dial button, a wireless communication module, an emergency call button and a logic circuit. The wireless communication module is used for dialing an emergency call according to a dial signal generated by the dial button when the wireless communication device is shut down. The logic circuit is used for transmitting an emergency call detecting signal generated by the emergency call button to the wireless communication module and a power circuit of the electronic device, wherein the power circuit supplies a first power source to the logic circuit and the wireless communication module when the electronic device is shut down.

7 Claims, 4 Drawing Sheets

(56) References Cited

U.S. PATENT DOCUMENTS

| | | | |
|---|---|---|---|
| 2010/0003950 A1* | 1/2010 | Ray | G10L 13/043 |
| | | | 455/404.1 |
| 2010/0064379 A1* | 3/2010 | Cassett | H04L 63/14 |
| | | | 726/34 |
| 2017/0099377 A1* | 4/2017 | Moran | H04M 1/72527 |
| 2017/0178531 A1* | 6/2017 | Swank | G06F 21/31 |
| 2017/0318146 A1* | 11/2017 | Peter | H04W 4/90 |

* cited by examiner

EMERGENCY CALL CIRCUIT FOR ELECTRONIC DEVICE

BACKGROUND OF THE INVENTION

1. Field of the Invention

The present invention relates to an emergency call circuit for an electronic device, and more particularly, to an emergency call circuit for an electronic device capable of dialing an emergency call when the electronic device is shut down.

2. Description of the Prior Art

Nowadays, electronic devices (e.g., smart phones) are equipped with a function of dialing emergency calls, but the function is activated to dial an emergency call only when the smart phone operates in an operating system. However, under the lack of power source (e.g., when a user is in outdoor or remote areas) and the smart phone is turned on to keep consuming battery power, a usage time of the emergency call may not be long enough until a rescue team has arrived. For example, when the user requires the rescue team in the remote area, the rescue team cannot contact the user if the smart phone runs out of the battery power, which is bad to the rescue operation.

Therefore, there is a need to provide an emergency call circuit for an electronic device capable of dialing an emergency call when the electronic device is shut down to prolong a usage time of the emergency call.

SUMMARY OF THE INVENTION

It is therefore an objective of the present invention to provide an emergency call circuit for an electronic device capable of dialing an emergency call when the electronic device is shut down to reduce power consumption and prolong a usage time of the emergency call.

The present invention discloses an emergency call circuit for an electronic device, and includes at least one dial button, a wireless communication module, an emergency call button, and a logic circuit. The at least one dial button is configured to generate at least one dial signal according to at least one dial input signal, wherein the at least one dial signal corresponds to at least one emergency call. The wireless communication module is coupled to the at least one dial button and the electronic device of a power source circuit, and configured to dial the at least one emergency call according to the at least one dial signal when the electronic device is shut down. The emergency call button is configured to generate an emergency call detecting signal according to an emergency call input signal. The logic circuit is coupled to the emergency call button, the wireless communication module and the power source circuit, and configured to transmit the emergency call detecting signal to the wireless communication module and the power source circuit, and receive a first power source according to the emergency call detecting signal. The power source circuit supplies the first power source to the emergency call circuit and the wireless communication module when the electronic device is shut down.

In the emergency call circuit of the present invention, the user may activate the emergency call function by pressing the emergency call button, wherein the emergency call circuit may force the electronic device to shut down, which reduces the power consumption of the electronic device to prolong the usage time of the emergency call. In one embodiment, the electronic device of the present invention may activate the emergency call function after it has been shut down to avoid the electronic device from shutting down due to an accidental press to the emergency call button, and the usage time of the emergency call is prolonged as well.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
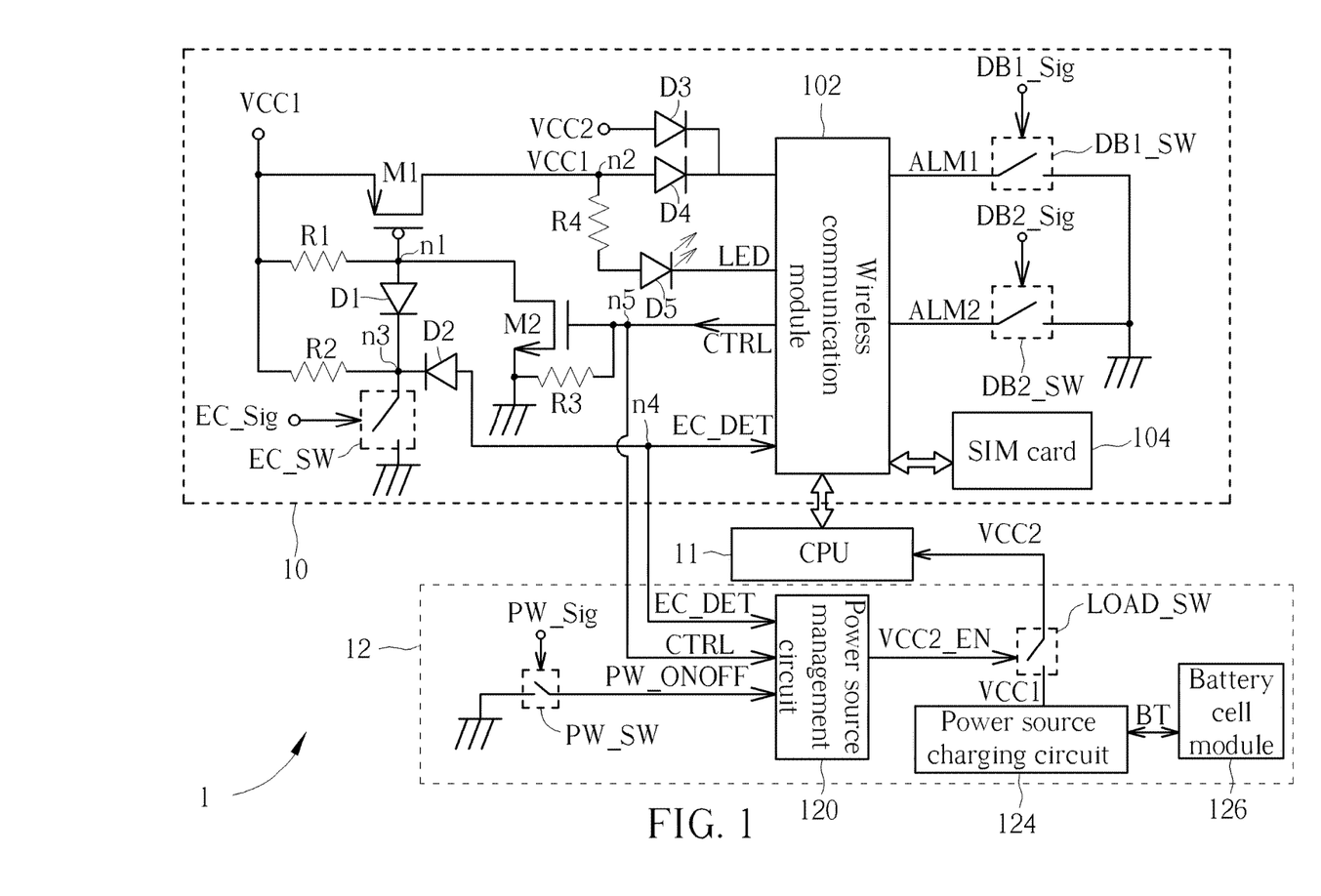
FIG. 1 is a schematic diagram of an electronic device according to a first embodiment of the present invention.

FIG. 1 is a schematic diagram of an electronic device 1 according to a first embodiment of the present invention. The electronic device 1 may be a device having a function of wireless communication, such as a smart phone, and include an emergency call circuit 10, a CPU (central processing unit) 11, and a power source circuit 12. The emergency call circuit 10 is coupled to the power source circuit 12, and configured to activate an emergency call function according to an emergency call input signal EC_sig. The power source circuit 12 is coupled to the CPU 11 and the emergency call circuit 10, and configured to supply a first power source VCC1 or a second power source VCC2 to the emergency call circuit 10, and supply the second power source VCC2 to the CPU 11. During a system boot phase (when the CPU 11 operates in an operating system), the power source circuit 12 may supply the second power source VCC2 to a wireless communication module 102 for general communication (wherein the wireless communication module 102 may call an emergency call) and supply the second power source VCC2 to the CPU 11 to perform general communication, so as to dial or receive a general call according to user operations. During a system shut down phase (when the CPU 11 does not operate in the operating system), the power source circuit 12 may supply the first power source VCC1 to the emergency call circuit 10 to perform the emergency call function.

The emergency call circuit 10 includes a wireless communication module 102, a SIM (Subscriber Identity Module) card 104, an emergency call button EC_SW and multiple dial buttons DB1_SW and DB2_SW. In one embodiment, the wireless communication module 102 and the SIM card 104 are configured to perform the general wireless communication to dial or receive a general call. For example, the wireless communication module 102 may access wireless communication services provided by a telecommunication operator according to user data stored in the SIM card 104. When the user is in remote areas out of wireless communication services, the user may use the wireless communication module 102 to dial an emergency call, wherein the wireless communication module 102 may store multiple emergency call numbers corresponding to multiple dial buttons.

The dial button DB1_SW and DB2_SW are coupled to the wireless communication module 102, and configured to respectively generate dial signals ALM1 and ALM2 to the wireless communication module 102 according to dial input signals DB1_sig and DB2_sig, wherein when the user presses the dial button DB1_SW or DB2_SW, the dial input signal DB1_sig or DB2_sig can be generated. For example, when the user presses the dial button DB1_SW, the dial input signal DB1_sig can be generated to the dial button DB1_SW, and the dial button DB1_SW generates the dial signal ALM1 to the wireless communication module 102, wherein the dial signal ALM1 corresponds to a first emergency call. Therefore, when the emergency call function is activated, as long as the user presses the dial button DB1_SW, the wireless communication module 102 dials the first emergency call according to the dial signal ALM1; if the user presses the dial button DB2_SW, the wireless communication module 102 dials a second emergency call according to the dial signal ALM2, and so forth.

The emergency call button EC_SW is configured to generate an emergency call detecting signal EC_DET to the wireless communication module 102 according to the emergency call input signal EC_sig, wherein when the user presses the emergency call button EC_SW, the emergency call input signal EC_sig is generated to activate the emergency call function.

The emergency call circuit 10 includes a logic circuit, and the logic circuit includes a first transistor M1, a second transistor M2, diodes D1, D2, D3 and D4, a LED (Light Emitting Diode) D5 and resistors R1, R2, R3 and R4. The first transistor M1 may be a P-type MOSFET (Metal-Oxide-Semiconductor Field-Effect Transistor), a source of the first transistor M1 is coupled to the first power source VCC1, a gate of the first transistor M1 is coupled to a first node n1, and a drain of the first transistor M1 is coupled to a second node n2. The diode D1 is coupled between the first node n1 and a third node n3. The diode D2 is coupled between the third node n3 and a fourth node n4. The diode D3 is coupled between the second node n2 and the wireless communication module 102. The diode D4 is coupled between the second node n2 and the wireless communication module 102. The LED D5 is coupled between the resistor R4 and the wireless communication module 102. The second transistor M2 may be an N-type MOSFET, a source of the second transistor M2 is coupled to the resistor R3 and a ground, a drain of the second transistor M2 is coupled to first node n1, a gate of the second transistor M2 is coupled to a fifth node n5. The resistor R1 is coupled between the first power source VCC1 and the first node n1, the resistor R2 is coupled between the first power source VCC1 and the third node n3, the resistor R3 is coupled between the fifth node n5 and the ground, and the resistor R4 is coupled between the second node n2 and an anode of the LED D5.

The first node n1 is coupled to the gate of the first transistor M1, the resistor R1, an anode of the diode D1 and the drain of the second transistor M2. The second node n2 is coupled to the drain of the first transistor M1, an anode of the diode D4 and the resistor R4. The third node n3 is coupled to a cathode of the diode D1, a cathode of the diode D2, the resistor R2 and the emergency call button EC_SW. The fourth node n4 is coupled to the anode of the diode D2 and the power source management circuit 120. The fifth node n5 is coupled to the gate of the second transistor M2, the resistor R3, the wireless communication module 102 and the power source management circuit 120.

The wireless communication module 102 is coupled to the CPU 11, the power source circuit 12, the SIM card 104 and the multiple dial buttons DB1_SW and DB2_SW, and configured to generate a control signal CTRL to the power source circuit 12 according to output signals of the CPU 11, and dial the first emergency call or the second emergency call according to the dial signal ALM1 or ALM2.

The power source circuit 12 includes a power source button PW_SW, a power source management circuit 120, a load switch LOAD_SW, a power source charging circuit 124 and a battery cell module 126. The power source button PW_SW is coupled to the power source management circuit 120, and configured to generate a power source enable signal PW_ONOFF to the power source management circuit 120 according to a power source input signal PW_sig, wherein the power source input signal PW_sig is generated when the user presses the power source button PW_SW.

The battery cell module 126 is configured to supply a battery power source BT. The power source charging circuit 124 is coupled to the battery cell module 126 and the load switch LOAD_SW, and configured to generate the first power source VCC1 to the load switch LOAD_SW and supply the first power source VCC1 to the emergency call circuit 10 according to the battery power source BT. The power source management circuit 120 is coupled to the power source button PW_SW, the wireless communication module 102 and the load switch LOAD_SW, and configured to generate an enable signal VCC2_EN to the load switch LOAD_SW according to the power source enable signal PW_ONOFF, the control signal CTRL and the emergency call detecting signal EC_DET. The load switch LOAD_SW is coupled to the power source management circuit 120, the power source charging circuit 124 and the CPU 11, and configured to output the second power source VCC2 to the CPU 11 according to the enable signal VCC2_EN, wherein the first power source VCC1 is a source of the second power source VCC2.

Operations of the electronic device 1 are described as follows, in the system boot phase, the control signal CTRL and the emergency call detecting signal EC_DET are at the high level, the power source management circuit 120 generates the enable signal VCC2_EN at the high level to the load switch LOAD_SW accordingly, so the load switch LOAD_SW outputs the second power source VCC2 to the CPU 11 and the wireless communication module 102. When the user presses the emergency call button EC_SW, the emergency call detecting signal EC_DET turns to at the low level, the power source management circuit 120 generates the enable signal VCC2_EN at the low level to the load switch LOAD_SW accordingly, so the load switch LOAD_SW stops outputting the second power source VCC2 to the CPU 11 and the wireless communication module 102, so as to perform a shut down procedure. As a result, when the user presses the emergency call button EC_SW to activate the emergency call function, the emergency call circuit 10 may force the electronic device 1 to shut down (i.e., force the CPU 11 turns off the operating system), which may reduce the power consumption of the electronic device 1.

Since the battery power source BT is the source of the first power source VCC1, as long as the battery power source BT is enough, the power source circuit 12 may still able to supply the first power source VCC1 when the electronic device is shut down. In the system shut down phase (i.e., the CPU 11 does not operate the operating system) and the user presses the emergency call button EC_SW, the first transistor M1 is turned on to supply the first power source VCC1 to the emergency call circuit 10, and the wireless communication module 102 is driven by the first power source VCC1 (the power source circuit 12 stops supplying the second power source VCC2 in the system shut down phase).

In addition, the first power source VCC1 may turn on the LED D5 to generate the indication signal LED at the high level to the wireless communication module 102 to notify that the user has activated the dial emergency call function. Then, when the user presses the dial button DB1_SW or DB2_SW, the input signal DB1_sig or DB2_sig may be generated to the dial button DB1_SW or DB2_SW to generate the dial signal ALM1 or ALM2 to the wireless communication module 102. Therefore, the wireless communication module 102 may dial the first emergency call or the second emergency call according to the dial signal ALM1 or ALM2 correspondingly.

As a result, by the operations as abovementioned, the electronic device 1 may activate the emergency call function once the user presses the emergency call button EC_SW to force the electronic device 1 shut down and dial the emergency call, which may reduce the power consumption of the electronic device 1 to prolong the usage time of the emergency call.

Figure 2:
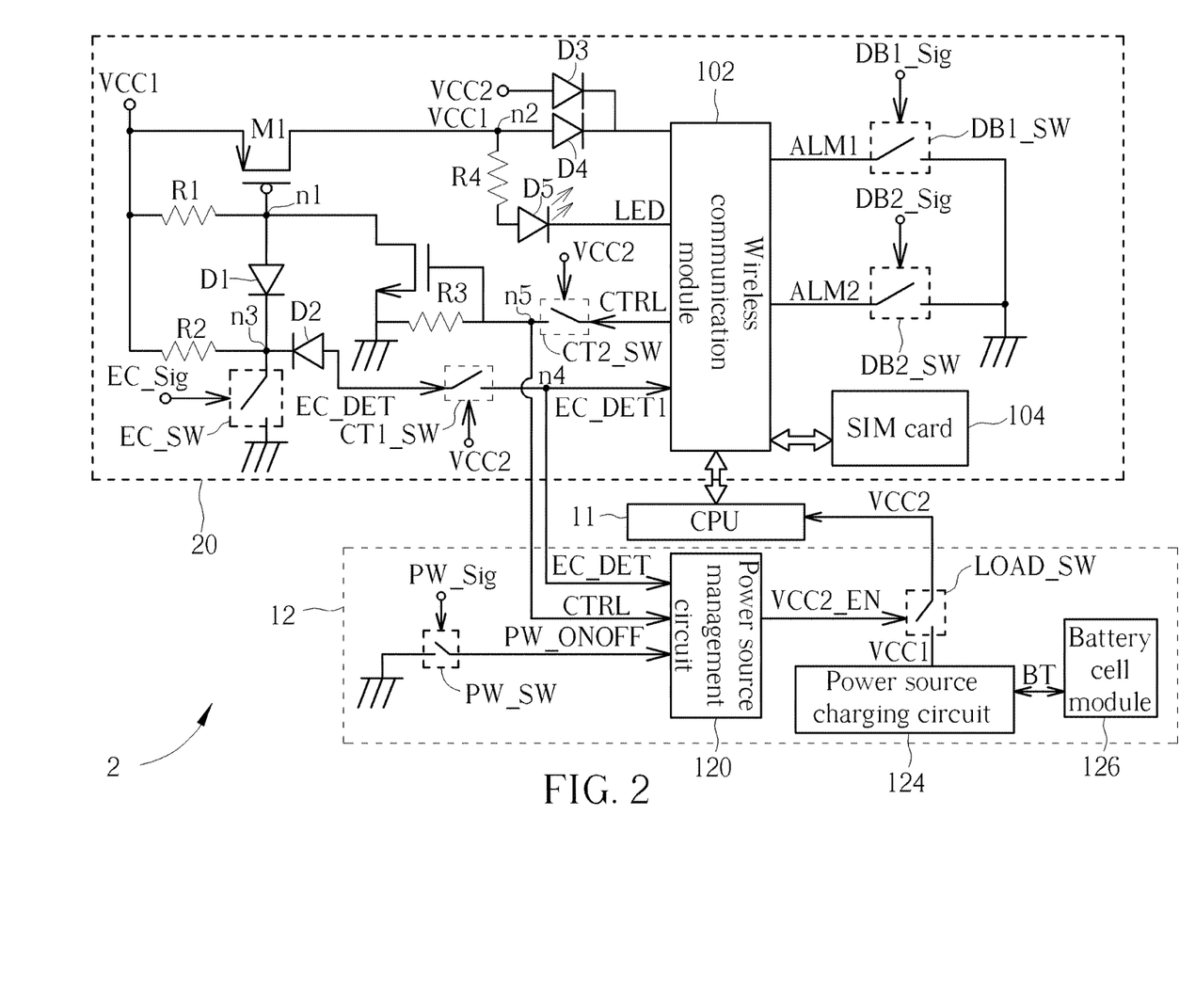
FIG. 2 is a schematic diagram of an electronic device according to a second embodiment of the present invention.

FIG. 2 is a schematic diagram of an electronic device 2 according to a second embodiment of the present invention. The electronic device 2 is similar to the electronic device 1, wherein same elements are denoted with the same symbols. The electronic device 2 includes an emergency call circuit 20, the CPU 11 and the power source circuit 12. The emergency call circuit 20 includes a logic circuit, the wireless communication module 102, the SIM card 104, the emergency call button EC_SW and the multiple dial buttons DB1_SW and DB2_SW. The logic circuit includes the first transistor M1, the second transistor M2, the diodes D1, D2, D3 and D4, the LED D5, the resistors R1, R2, R3 and R4, a first switch CT1_SW and a second switch CT2_SW.

An input terminal of the first switch CT1_SW is coupled to the anode of the diode D2, an output terminal of the first switch CT1_SW is coupled to the fourth node n4, and configured to receive the emergency call detecting signal EC_DET, and output an emergency call detecting signal EC_DET1 to the wireless communication module 102 and the power source management circuit 120 according to the second power source VCC2, wherein the call detecting signal EC_DET is a source of the emergency call detecting signal EC_DET1. When the second power source VCC2 is at the high level (in the system boot phase), the first switch CT1_SW cannot output the emergency call detecting signal EC_DET1 to the wireless communication module 102 and the power source management circuit 120 and is unable to activate the emergency call function; on the contrary, when the second power source VCC2 is at the low level (in the system shut down phase), the first switch CT1_SW may output the emergency call detecting signal EC_DET1 to the wireless communication module 102 and the power source management circuit 120 and is able to activate the emergency call function.

An input terminal of the second switch CT2_SW is coupled to the wireless communication module 102, an output terminal of the second switch CT2_SW is coupled to the fifth node n5, and configured to receive the control signal CTRL, and output a control signal CTRL1 to the power source management circuit 120 according to the second power source VCC2, wherein the control signal CTRL is a source of the control signal CTRL1. When the second power source VCC2 is at the high level (in the system boot phase), the second switch CT2_SW cannot output the control signal CTRL1 to the power source management circuit 120 and is unable to stop the power source management circuit 120 from supplying the second power source VCC2 to the CPU 11, so the electronic device 2 will not be forced shut down; on the contrary, when the second power source VCC2 is at the low level (in the system shut down phase), the second switch CT2_SW can output the control signal CTRL1 to the power source management circuit 120, and the power source management circuit 120 is able to supply the first power source VCC1 to the emergency call circuit 20 to activate the emergency call function.

Operations of the electronic device 2 are described as follows, in the system boot phase, the control signal CTRL and the emergency call detecting signal EC_DET are at the high level, the power source management circuit 120 generates the enable signal VCC2_EN at the high level to the load switch LOAD_SW, and the load switch LOAD_SW outputs the second power source VCC2 to the CPU 11 and the wireless communication module 102. When the user presses the emergency call button EC_SW, the emergency call detecting signal EC_DET turns to at the low level. While in the system boot phase, the power source management circuit 120 supplies the second power source VCC2 but the second switch CT2_SW is unable to output the control signal CTRL1 to the power source management circuit 120, which prevents the power source management circuit 120 from stop supplying the second power source VCC2 to the CPU 11 and prevents the CPU 11 from shutting down. As a result, the electronic device 2 will not be forced to shut down due to accidental press to the emergency call button EC_SW by the user.

When the electronic device 2 is shut down and the second power source VCC2 is at the low level, the second switch CT2_SW may output the control signal CTRL1 to the power source management circuit 120, and the power source management circuit 120 may supply the first power source VCC1 to the emergency call circuit 20 to activate the emergency call function. In addition, the first power source VCC1 may turn on the LED D5 to generate the indication signal LED at the high level to the wireless communication module 102 to notify that the user has activated the dial emergency call function. Then, as long as the user presses the emergency call button EC_SW, the first switch CT1_SW may output the emergency call detecting signal EC_DET1 to the wireless communication module 102 and the power source management circuit 120 to perform the emergency call function. When the user presses dial button DB1_SW or DB2_SW, the input signal DB1_sig or DB2_sig may be generated to the dial button DB1_SW or DB2_SW to generate the dial signal ALM1 or ALM2 to the wireless communication module 102, so the wireless communication module 102 dials the first emergency call or the second emergency call according to the dial signal ALM1 or ALM2 correspondingly.

As a result, by the operations above mentioned, the electronic device 2 may activate the emergency call function after it is shut down to prevent the situation that the electronic device 2 is forced shutting down due to accidental press to the emergency call button EC_SW by the user, and the usage time of emergency call is prolonged as well.

Figure 3:
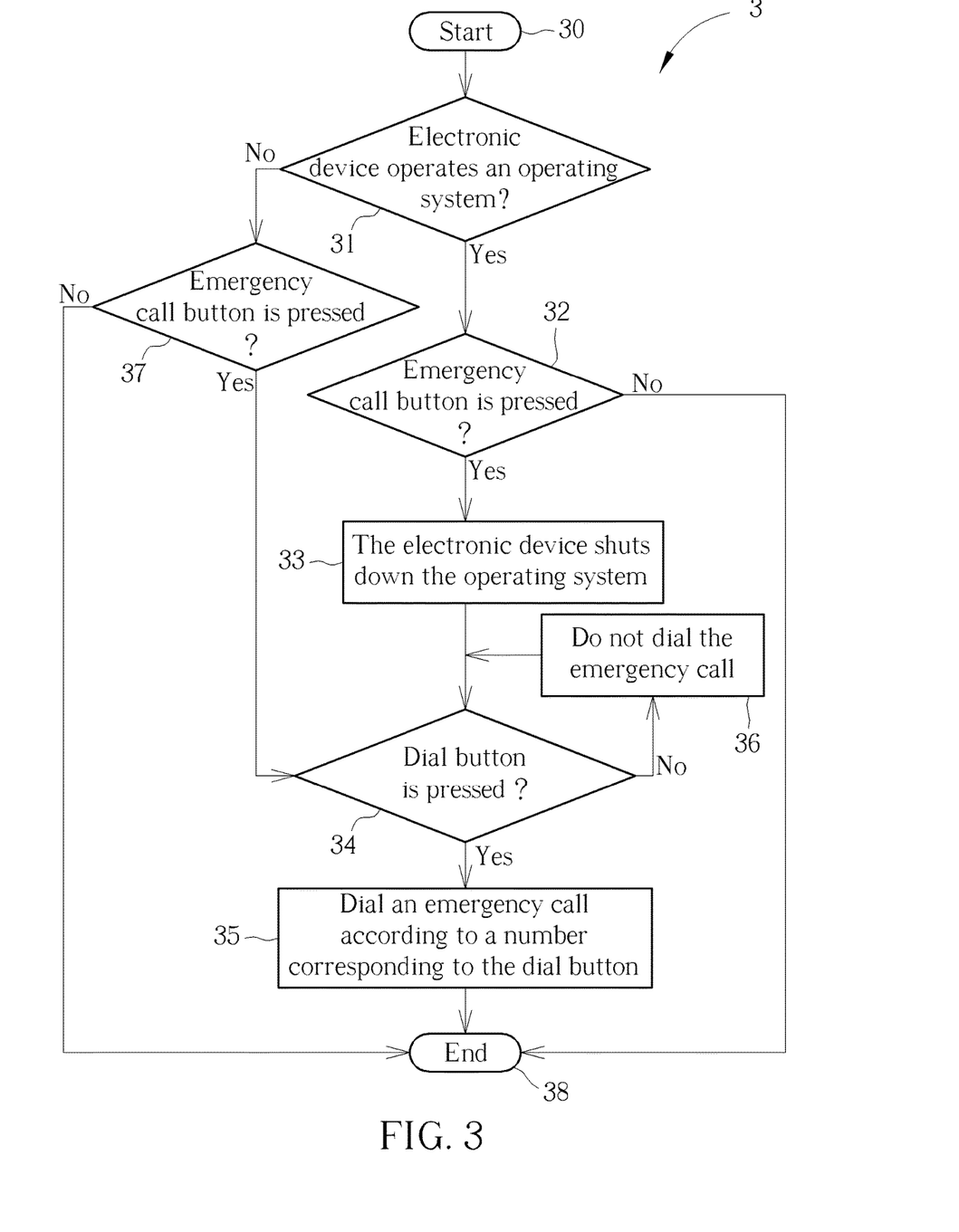
FIG. 3 is a flowchart of a process performed by the electronic device in FIG. 1 according to the first embodiment of the present invention.

Operations of the electronic device 1 may be summarized into a process 3 for shutting down the electronic device 1 and the operating system when the user presses the emergency call button EC_SW to activate the emergency call function, so as to reduce the power consumption of the electronic device 1 to prolong the usage time of the emergency call function. As shown in FIG. 3, the process 3 includes the following steps.

Step 30: Start.

Step 31: Determine whether an electronic device operates an operating system? Go to Step 32 if yes; go to Step 37 if no.

Step 32: Determine whether an emergency call button is pressed? Go to Step 33 if yes; Step 38 if no.

Step 33: The electronic device shuts down the operating system.

Step 34: Determine whether a dial button is pressed? Go to Step 35 if yes; go to Step 36 if no.

Step 35: Dial an emergency call according to a number corresponding to the dial button. Go to Step 38.

Step 36: Do not dial the emergency call. Return to Step 33.

Step 37: Determine whether the emergency call button is pressed? Go to Step 34 if yes; go to Step 38 if no.

Step 38: End.

Operations regarding the process 3 may be obtained by referring to the description of FIG. 1, which is omitted.

Figure 4:
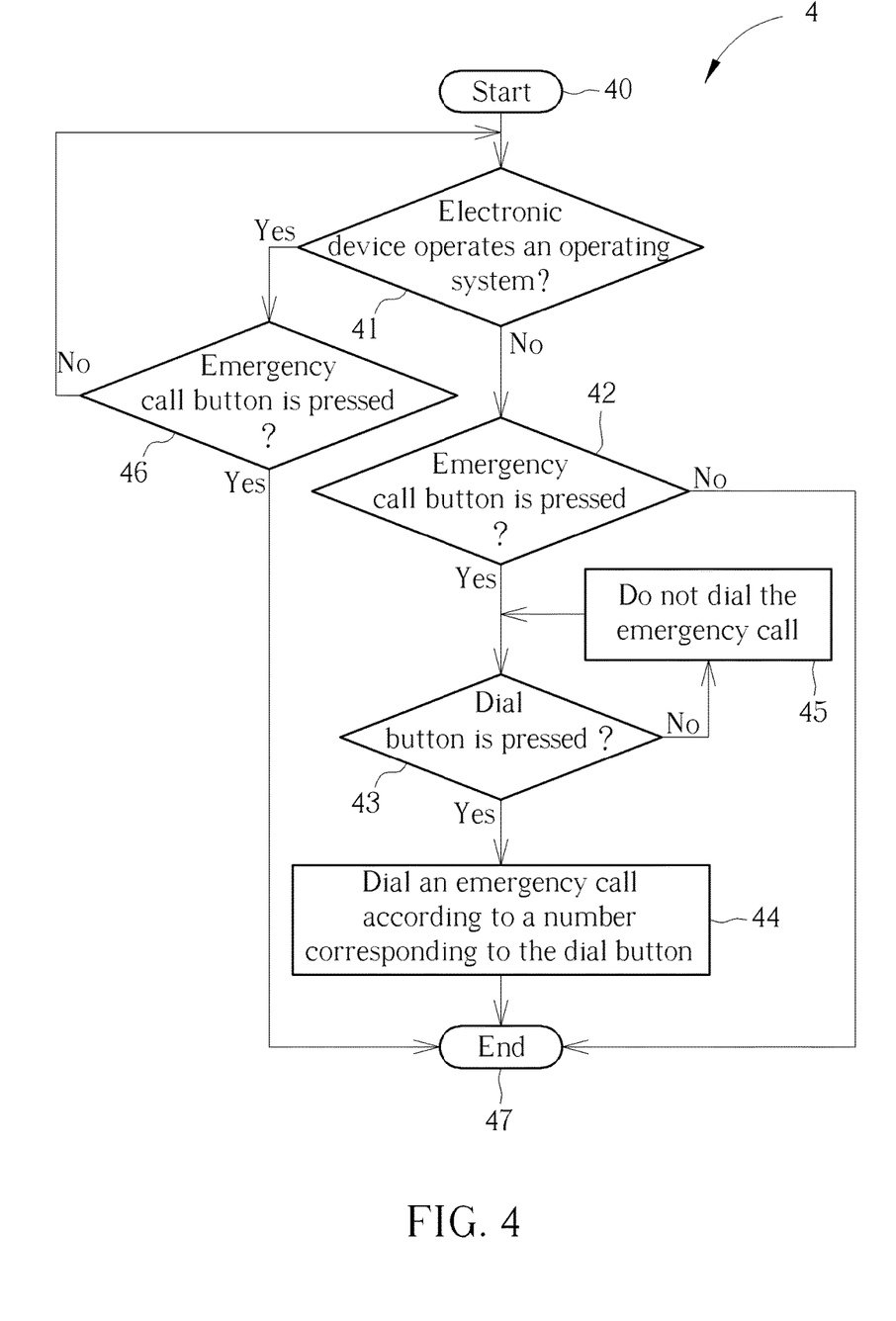
FIG. 4 is a flowchart of a process performed by the electronic device in FIG. 2 according to the second embodiment of the present invention.

Operations of the electronic device 2 may be summarized into a process 4 for not activating the emergency call function when the electronic device 2 operates the operating system, which prevents the situation that the electronic device 2 from forcedly shutting down due to accidental press to the emergency call button EC_SW by the user, and the usage time of emergency call is prolonged as well. Moreover, the process 4 may display a message to notify the user that the operating system must be shut down to activate the emergency call function, which may reduce the power consumption of the electronic device 2 to prolong the usage time of the emergency call function. As shown in FIG. 4, the process 4 includes the following steps.

Step 40: Start.

Step 41: Determine whether an electronic device operates an operating system? Go to Step 42 if no; go to Step 46 if yes.

Step 42: Determine whether an emergency call button is pressed? Go to Step 43 if yes; go to Step 47 if no.

Step 43: Determine whether a dial button is pressed? Go to Step 44 if yes; go to Step 45 if no.

Step 44: Dial an emergency call according to a number corresponding to the dial button. Go to Step 47.

Step 45: Do not dial the emergency call. Return to Step 43.

Step 46: Determine whether the emergency call button is pressed? Go to Step 47 if yes; return to Step 41 if no.

Step 47: End.

Operations regarding the process 4 may be obtained by referring to the description of FIG. 2, which is omitted.

To sum up, advantages of the electronic device of the present invention includes at least one of the following: (1) the emergency call function can be activated when the electronic device is shut down, and unnecessary power consumption is avoided to preserve the battery power only for the emergency call function to prolong the usage time of the emergency call; (2) the emergency call function is only for specific emergency call number to prevent the user from dialing unnecessary calls to avoid unnecessary power consumption; (3) the user may press the emergency call button to activate the emergency call function, and then press the dial button to dial the emergency call, such simple operations are user convenient; (4) the emergency call function can be activated only when the electronic device has been shut down to prevent the electronic device from forcedly shutting down due to accidental press to the emergency call button by the user; and (5) since the emergency call function can be activated only when the electronic device has been shut down, any person can use the electronic device (smart phone) to dial the emergency call without any password inputted to the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An emergency call circuit for an electronic device, comprising:

at least one dial button configured to generate at least one dial signal according to at least one dial input signal, wherein the at least one dial signal corresponds to at least one emergency call;

a wireless communication module coupled to the at least one dial button and a power source circuit of the electronic device, and configured to dial the at least one emergency call according to the at least one dial signal when the electronic device is shut down;

an emergency call button configured to generate an emergency call detecting signal according to an emergency call input signal, wherein when a user presses the emergency call button, the emergency call input signal is generated to activate an emergency call function of the electronic device to shut down the electronic device and keep the wireless communication module turning on; and a logic circuit coupled to the emergency call button, the wireless communication module and the power source circuit, and configured to transmit the emergency call detecting signal to the wireless communication module and the power source circuit, and receive a first power source according to the emergency call detecting signal;

wherein the power source circuit supplies the first power source to the emergency call circuit and the wireless communication module when the electronic device is shut down;

wherein the logic circuit comprises:

a first transistor comprising a source coupled to the first power source, a gate coupled to a first node, and a drain coupled to a second node, wherein the first transistor is a P-type MOSFET (Metal-Oxide-Semiconductor Field-Effect Transistor);

a first diode comprising an anode coupled to the first node, and a cathode coupled to the third node;

a second diode comprising an anode coupled to a fourth node, and a cathode coupled to the third node;

a third diode comprising an anode coupled to the power source circuit, and a cathode coupled to the wireless communication module;

a fourth diode comprising an anode coupled to the second node, and a cathode coupled to the wireless communication module;

a first resistor coupled between the first power source and the first node;

a second resistor coupled between the first power source and the third node;

a third resistor coupled between a fifth node and a ground;

a fourth resistor coupled between the second node and a light emitting diode;

the light emitting diode, comprising an anode coupled to the fourth resistor, and a cathode coupled to the wireless communication module; and a second transistor comprising a source coupled to the third resistor and the ground, a drain coupled to the first node, and a gate coupled to the fifth node, wherein the second transistor is an N-type MOSFET.

2. The emergency call circuit of claim 1, wherein the power source circuit comprises:

a battery cell module configured to supply a battery power source;

a power source charging circuit coupled to the battery cell module, and configured to generate the first power source according to the battery power source to supply the first power source to the emergency call circuit when the electronic device is shut down;

a power source button configured to generate a power source enable signal according to a power source input signal;

a power source management circuit coupled to the power source button and the wireless communication module, and configured to generate an enable signal according to the power source enable signal, a control signal generated by the wireless communication module and the emergency call detecting signal; and a load switch coupled to the power source management circuit, the power source charging circuit and a central processing unit of the electronic device, and configured to output a second power source to the central processing unit according to the enable signal, wherein the first power source is a source of the second power source.

3. The emergency call circuit of claim 2, wherein in the system boot phase, the control signal and the emergency call detecting signal is at a high level, the power source management circuit generates the enable signal at the high level to the load switch, and the load switch outputs the second power source to the central processing unit and the wireless communication module.

4. The emergency call circuit of claim 3, wherein in the system boot phase, when the emergency call detecting signal is at a low level, the power source management circuit generates the enable signal at the low level to the load switch, and the electronic device performs a shut down procedure, the load switch stops outputting the second power source to the central processing unit and the wireless communication module.

5. The emergency call circuit of claim 2, wherein the logic circuit comprises:

a first switch comprising an input terminal coupled to the second diode of anode, and an output terminal coupled to the fourth node, and configured to receive the emergency call detecting signal, and output a first emergency call detecting signal to the wireless communication module and the power source management circuit according to the second power source, wherein the call detecting signal is a source of the first emergency call detecting signal; and a second switch comprising an input terminal coupled to the wireless communication module, and an output terminal coupled to the fifth node, and configured to receive the control signal, and output a first control signal to the power source management circuit according to the second power source, wherein the control signal is a source of the first control signal.

6. The emergency call circuit of claim 5, wherein when the second power source is at a high level, the first switch does not output the first emergency call detecting signal to the wireless communication module and the power source management circuit, and not activate the emergency call circuit; when the second power source is at a low level, the first switch outputs the first emergency call detecting signal to the wireless communication module and the power source management circuit to activate the emergency call circuit.

7. The emergency call circuit of claim 5, wherein when the second power source is at a high level, the second switch does not output the first control signal to the power source management circuit, and the power source management circuit supplies the second power source to the central processing unit; when the second power source is at a low level, the second switch outputs the first control signal to the power source management circuit, and the power source management circuit supplies the first power source to the emergency call circuit.

* * * * *